(12) United States Patent
Gang

(10) Patent No.: US 7,023,122 B2
(45) Date of Patent: Apr. 4, 2006

(54) TUMBLING MAGNET ELECTRICITY GENERATING SYSTEM

(75) Inventor: Qin Gang, 63 Grays Inn Road, London (GB) WC1X 8TL

(73) Assignee: Qin Gang, London (GB)

( * ) Notice: Subject to any disclaimer, the term of this patent is extended or adjusted under 35 U.S.C. 154(b) by 0 days.

(21) Appl. No.: 10/528,004

(22) PCT Filed: Nov. 24, 2003

(86) PCT No.: PCT/GB03/05100

§ 371 (c)(1),
(2), (4) Date: Mar. 14, 2005

(87) PCT Pub. No.: WO2004/068681

PCT Pub. Date: Aug. 12, 2004

(65) Prior Publication Data

US 2006/0001323 A1    Jan. 5, 2006

(30) Foreign Application Priority Data

Jan. 27, 2003 (GB) .................................. 0301870

(51) Int. Cl.
*H02K 21/00* (2006.01)
*H02K 35/02* (2006.01)
(52) U.S. Cl. .................. 310/181; 310/75 C; 310/67 A; 310/73
(58) Field of Classification Search .............. 310/67 A, 310/1, 75 C, 156.01, 71, 181
See application file for complete search history.

(56) References Cited

U.S. PATENT DOCUMENTS

| | | | | |
|---|---|---|---|---|
| 3,987,409 A | * | 10/1976 | Freeman | 340/432 |
| 4,095,663 A | * | 6/1978 | Gaffney | 180/205 |
| 4,360,771 A | * | 11/1982 | Grenlund | 310/74 |
| 5,590,946 A | * | 1/1997 | Jung | 362/475 |
| 5,606,210 A | * | 2/1997 | Lin | 310/153 |
| 6,822,357 B1 | * | 11/2004 | Hung | 310/75 C |
| 2003/0197433 A1 | * | 10/2003 | Cheung et al. | 310/14 |

FOREIGN PATENT DOCUMENTS

WO    WO 200133700 A1 *    5/2001

* cited by examiner

*Primary Examiner*—Darren Schuberg
*Assistant Examiner*—Erik Preston

(57) ABSTRACT

The first magnet (9) is set free to tumble within a tumbling chamber (10). A coil (11) wound around the out surface of the tumbling chamber (10). The two ends of the coil (11) are connected to the terminals of an LED (light emitting diode) (3). There may be some arbitrary, relative motion between the first magnet (9) and the second magnet (2). The magnets depicted with dotted lines represent alternative, relative motions of the second magnet (2) with respect to the first magnet (9). As the first magnet (9) and the second magnet (2) pass close to one another, the mutual interaction of the magnetic fields is sufficient to cause the first magnet (9) to tumble in the tumbling chamber (10). As the first magnet (9) tumbles in the tumbling chamber (10), a varying magnetic filed flux is effected through the coil (11) and a corresponding electric current flows through the coil (11) thus illuminating the LED 3.

5 Claims, 3 Drawing Sheets

TUMBLING MAGNET ELECTRICITY GENERATING SYSTEM

This invention relates to an electricity generating system in which electromagnetic induction is effected by way of a permanent magnet tumbling (caused by another magnet) in a coil, and produces a varying magnetic field flux through the coil, such that a corresponding potential difference is formed across opposite ends of the coil (generating electricity). It is applicable to illumination of a bicycle for safety purposes, or run other electric appliances.

A voltage is set up across opposite ends of a coil in a magnetic field whenever the magnetic field changes. This effect is called electromagnetic induction. If the coil forms part of a closed circuit the induced voltage causes a current to flow in the circuit. The majority of known electricity generating systems are based on the phenomenon of electromagnetic induction.

According to an embodiment of the invention there is provided a tumbling magnet electricity generating system for supplying electricity to at least one electrical device, comprising a tumbling chamber, a first magnet arranged within the tumbling chamber, a second magnet arranged externally to the tumbling chamber, and a coil looped around the tumbling chamber, adapted such that the tumbling chamber is of sufficient dimensions to allow the first magnet to freely tumble, and such that on proximal relative motion of said first and second magnets, causes the first magnet to tumble in the tumbling chamber, generating a varying magnetic flux through the coil such that a corresponding potential difference is formed across opposite ends of the coil. It generates electricity to run an electric appliance, e.g. an LED (Light Emitting Diode).

Figure 1:
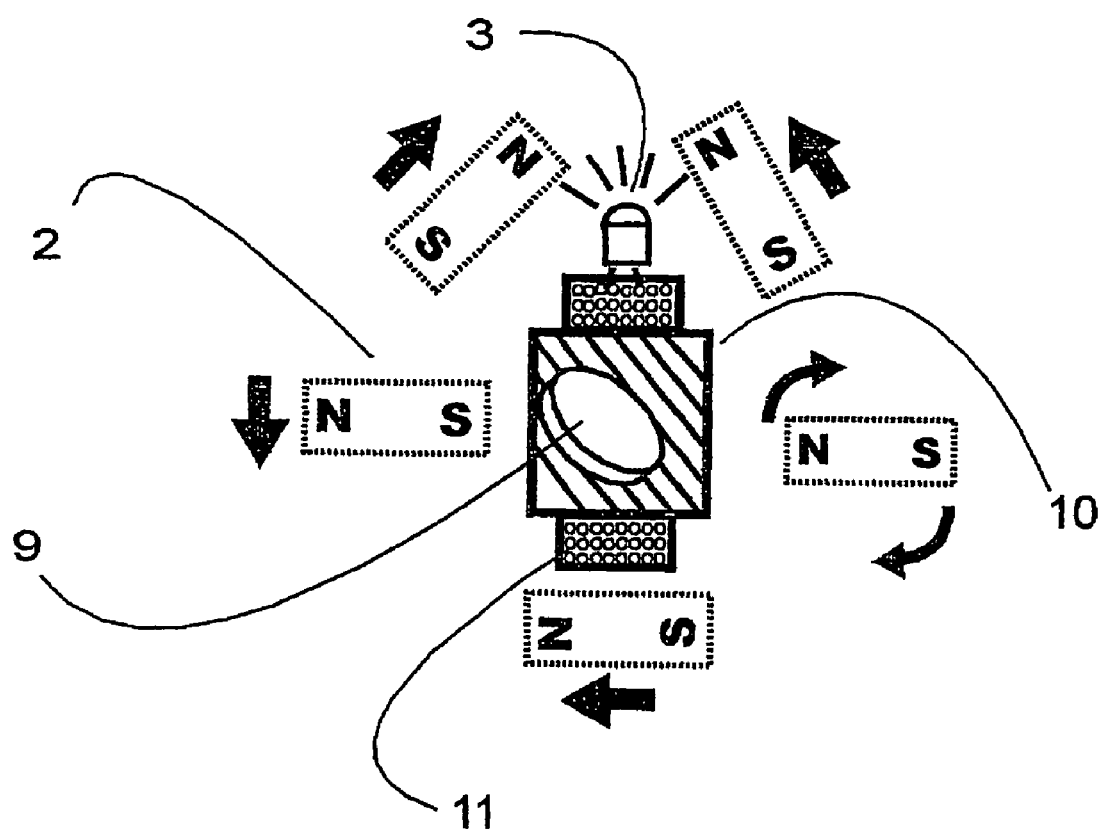

A specific embodiment of the invention will now be described by way of example and with reference to the accompanying drawings in which:

FIG. 1 shows a cross-sectional view of an electricity generating system. The first magnet 9 is set free to tumble within a tumbling chamber 10 around which a coil 11 is looped. The two ends of the coil 11 are connected to the terminals of an LED (light emitting diode) 3. There may be some arbitrary, relative motion between the first magnet 9 and the second magnet 2. The magnets depicted with dotted lines represent alternative, relative motions of the second magnet 2 with respect to the first magnet 9. As the first magnet 9 and the second magnet 2 pass close to one another, the mutual interaction of the magnetic fields is sufficient to cause the first magnet 9 to tumble in the tumbling chamber 10. As the first magnet 9 tumbles in the tumbling chamber 10, a varying magnetic field flux is effected through the coil 11 and a corresponding electric current flows through the coil 11 thus illuminating the LED 3.

Figure 2:
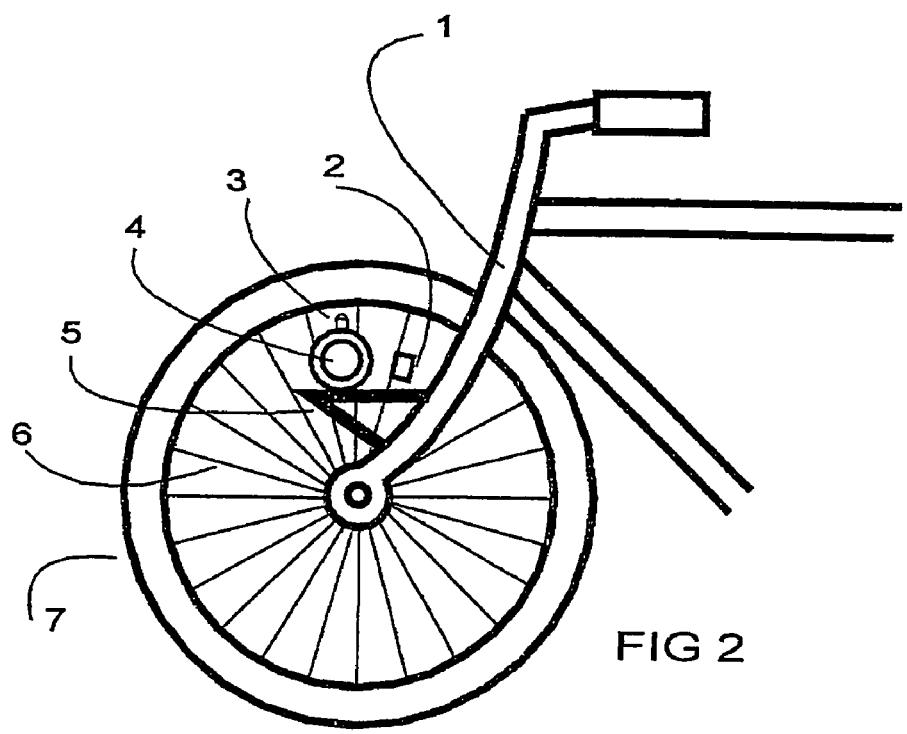

FIG. 2 shows an electricity generating unit 4 attached supportedly on a front wheel fork 1 of a bicycle. The support 5 is made of non-magnetic materials. The second magnet 2 is fixedly attached to the spokes 6 of the bicycle wheel 7. As the wheel rotates, the second magnet 2 will pass close to the electricity generating unit 4, containing the first magnet 9, once per revolution of the bicycle wheel 7 and will generate electricity as described above.

Figure 3:
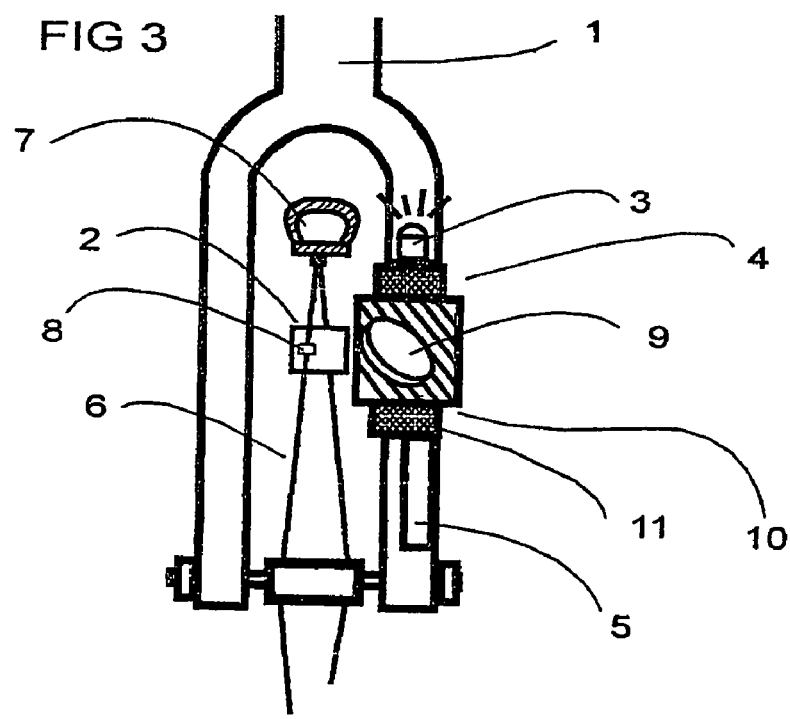

FIG. 3 represents a cross-sectioned front view of an electricity generating system. The electricity generating unit 4 is made from a coil 11 of insulated copper wire wound around a tumbling chamber 10 which is of non-magnetic, synthetic materials. The two coil 11 ends are connected to the terminals of an LED 3. The first magnet 9 is a disc shaped permanent magnet and is enclosed within the tumbling chamber 10. The tumbling chamber 10 is of sufficient dimensions to allow the first magnet 9 to tumble freely. The second magnet 2, a permanent magnet is fixedly attached to the spokes 6 of the bicycle wheel 7 by a fixing member 8. As the bicycle wheel 7 rotates, the second magnet 2 passes close to the first magnet 9 whereupon the interaction of their magnetic fields will cause the first magnet 9 to tumble in the tumbling chamber 10. As the first magnet 9 tumbles, it produces a rapidly varying magnetic field that induces an electric current to flow through the coil 11 and to light the LED 3.

Figure 4:
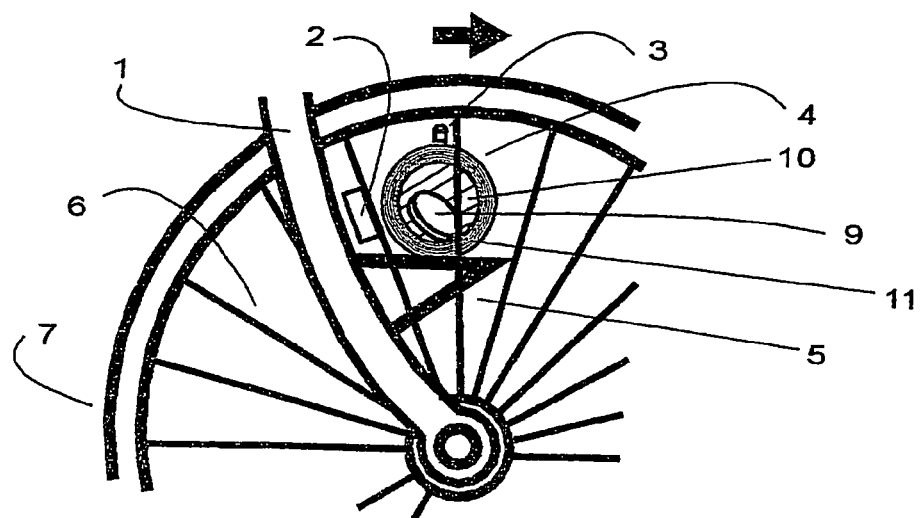
Figure 5:
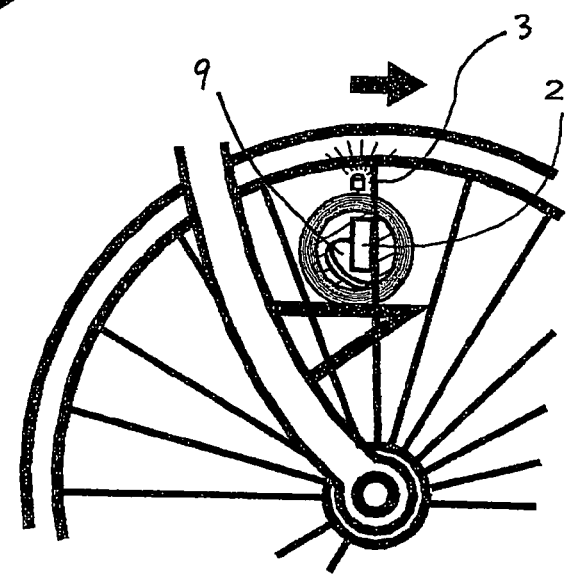
Figure 6:
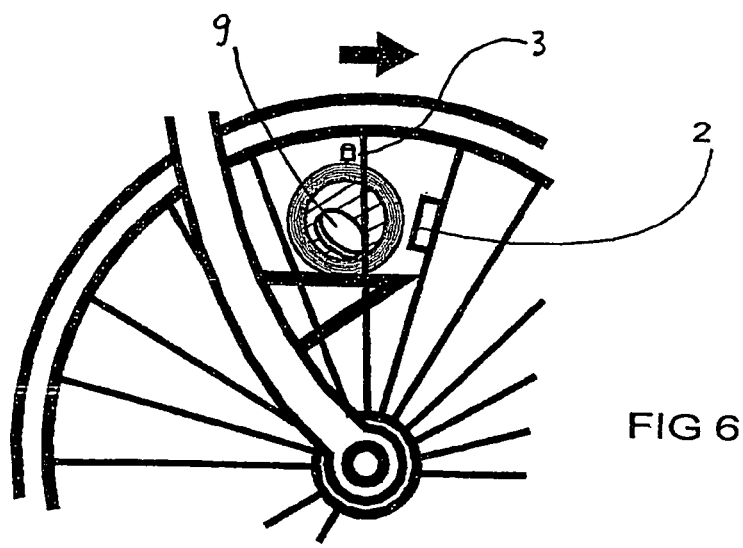

FIGS. 4–6 are viewed perpendicular to the plane of rotation of a bicycle wheel 7 and include cross-sectional views of the tumbling chamber 10 FIGS. 4–6 illustrate the operation of the electricity generating system during a revolution of a bicycle wheel.

FIG. 4 shows the second magnet 2 approaching the first magnet 9. The interaction of their magnetic fields will not be strong enough to cause the first magnet 9 to tumble in the tumbling chamber 10. No electric voltage will be generated in the coil 11. The LED 3 is off.

FIG. 5 shows the second magnet 2 passing proximal to the first magnet 9 as the bicycle wheel 7 rotates. When the distance between first magnet 9 and the second magnet 2 is at a minimum, the magnetic interaction will be causing the first magnet 9 to tumble in the tumbling chamber 10. As the first magnet 9 tumbles, a rapidly varying magnetic field flux induces an electric current to flow in the coil 11 and thus causes the LED 3 to be illuminated.

FIG. 6 shows the second magnet 2 having moved passed the first magnet 9. The interaction of their magnetic fields will not be strong enough to cause the first magnet 9 to tumble in the tumbling chamber 10. No electric voltage will be generated in the coil 11. The LED 3 is off.

Accordingly there will be a part of each revolution of the wheel 7 during which the LED 3 will be at least flickeringly illuminated. As the rotation speed of the wheel increases, the frequency of at least flickeringly illuminated periods increases proportionally.

What is claimed is:

1. A tumbling magnet electricity generating system for supplying electricity to at least one electrical device, comprising a tumbling chamber (10), a first magnet (9) arranged within the tumbling chamber (10), a second magnet (2) arranged externally to the tumbling chamber (10), and a coil (11) looped around the tumbling chamber (10), adapted such that the tumbling chamber (10) is of sufficient dimensions to allow the first magnet (9) to freely tumble, and such that on proximal relative motion of said first and second magnets, the mutual interaction of the magnetic fields is sufficient to cause the first magnet (9) to tumble in the tumbling chamber (10), generating a varying magnetic flux through the coil (11) such that a corresponding potential difference is formed across opposite ends of the coil (11), generating electricity to run an electric appliance.

2. A tumbling magnet electricity generating system as claimed in claim 1, wherein the tumbling chamber (10) is substantially of non-magnetic material.

3. A tumbling magnet electricity generating system as claimed in claim 1 wherein the coil (11) comprises an insulated copper wire wound around the outer surface of the tumbling chamber (10), the opposite ends of the coil (11) being electrically connected to terminals of an electric appliance.

4. A tumbling magnet electricity generating system as claimed in claim 1 wherein the first magnet (9) is substantially of a known geometric shape.

5. A tumbling magnet electricity generating system as claimed in one of claims 1 and 2, wherein the tumbling chamber (10) is substantially of a known geometric shape.

* * * * *